United States Patent [19]

Fauth, Sr. et al.

[11] Patent Number: 4,836,358
[45] Date of Patent: Jun. 6, 1989

[54] CONVEYOR DRIVE UNIT

[75] Inventors: Frederick E. Fauth, Sr., Towson; Paul E. Barkley, Sykesville, both of Md.

[73] Assignee: American Bottlers Equipment Co., Inc., Owings Mills, Md.

[21] Appl. No.: 53,644

[22] Filed: May 26, 1987

[51] Int. Cl.⁴ .............................................. B65G 13/06
[52] U.S. Cl. .................................... 198/789; 198/791; 74/606 A; 74/DIG. 10
[58] Field of Search ................................ 198/780–791, 198/347; 74/606 A, 606 R, 412 TA, 665 GA, DIG. 10

[56] References Cited

U.S. PATENT DOCUMENTS 4,033,450 7/1977 Paddock et al. ............... 198/803.01
4,313,536 2/1982 Fauth ............................... 198/781

Primary Examiner—Robert J. Spar
Assistant Examiner—Lyle K. Kimms
Attorney, Agent, or Firm—Wegner & Bretschneider

[57] ABSTRACT

A drive unit for a roller-type conveyor system which comprises a drive gear mounted on a drive shaft within heat sink plates and driving a number of pinion gears connected to a pinion shaft each of which is connected to a roller by crimping with a flexible shaft. Each pinion shaft is completely supported within the heat sink plates. A tangential drive frangible sprocket wheel is directly connected to the drive shaft. The mounting plates relieve heat generated from the drive shaft and the frangible sprocket wheel. A number of transport mechanisms containing rollers and a control unit as just described are mounted together to form a conveyor system.

18 Claims, 3 Drawing Sheets

CONVEYOR DRIVE UNIT

BACKGROUND OF THE INVENTION

This invention relates to transfer mechanisms and, more particularly, this invention relates to an improved conveyor drive unit for use in a transfer mechanism for transporting articles or containers.

Article transfer or conveying systems used in industry have often utilized chain-type conveyors disposed alongside each other and have used a "dead plate" between conveyor stations. However, articles tend to remain on the dead plate if no articles immediately follow the moving articles to push them along. Also, there is nothing to prevent unstable articles from falling over when pushed onto or off of the dead plate. Moreover, the friction inherent between the chain and certain types of the moving articles which it supports could cause backing up of the articles. This problem was recognized and a solution has been provided with the use of rollers as means for supporting and conveying the articles.

With the use of rollers, there is much less contact area between the conveyor surface and the articles, thereby improving the control of the articles being transported. Moreover, as with U.S. Pat. No. 4,313,536, separate drive systems can be implemented at various portions of a roller-type conveyor system which further increases flexibility in the movement of the articles and relieves pressure due to article accumulation.

U.S. Pat. No. 4,313,536 describes separate drive systems in order to obtain flexibility in controlling the movement of articles. In this drive system, a drive shaft with a gear and a system of pinion gears driven thereby are openably mounted on thin mounting plates. The pinion gears drive rigid shafts which, in turn, are connected to the rollers via flexible shafts. The drive shaft is enclosed within bushings located between the thin mounting plates. Thus, heat generated in the rotating elements, especially the drive shaft and the sprocket wheel, of the drive unit of the above-cited patent cannot be dissipated by the mounting plates. The heat is, therefore, retained in the unit, possibly leading to the annealing or weakening of the affected elements.

In addition, the sprocket wheel used on the device of U.S. Pat. No. 4,313,536 requires multiple "hang loads" on the drive shaft, including the bearing and washers abutting the sprocket wheel, as well as the spring and washers abutting the end bolt for making up the clutch-type mechanism for engaging the sprocket wheel to the drive shaft. Thus, a significant vertical load is applied to the drive shaft thereby contributing to the bending stress on the drive shaft. Further, the sprocket wheel is of a design requiring an increased pressure from the chain to drive the sprocket wheel further contributing to the undesirable stresses, including bending and torsion stresses, exerted on the drive shaft. Still further, sets of rollers operated by a single chain can jam when debris or an article is caught between a set of rollers operated by a drive unit since the sprocket wheel cannot stop the drive unit under such conditions.

Accordingly, there is a need for an efficient, economical, simply constructed and easily installed improved conveyor drive unit for providing a much reduced load applied on the drive shaft.

SUMMARY OF THE INVENTION

With the foregoing background of the invention in mind, and as the following description of the invention proceeds it will be appreciated that the primary object of the present invention is to provide an improved conveyor drive unit which is free of the aforementioned and other such disadvantages.

It is another primary object of &he invention to provide an improved conveyor drive unit and a method of operation thereof which avoids the inadequacies inherent in the prior art.

It is a further object of the present invention to provide an improved conveyor drive unit which can be rapidly and easily installed in a roller-type article transfer system.

It is a further object of the present invention to provide an improved conveyor drive unit which has a sprocket means capable of operating on a tangential drive, thereby reducing the vertical load applied on the drive shaft.

It is still another object of the present invention to provide an improved drive control unit which has a reduced force exerted on the drive shaft, and reduced force required to pull the sprocket means.

It is a further object of the present invention to provide an improved conveyor drive unit having frangible sprocket means capable of shearing when abnormal loads are experienced in the rollers in order to preclude jamming of a set of rollers driven by a single chain.

It is yet another object of the present invention to provide an improved conveyor drive unit having heat sink means for dissipating heat generated in the sprocket means and the drive shaft.

It is yet another object of the present invention to provide an improved conveyor drive unit capable of minimizing the "hang load" on the drive shaft, thereby further reducing the vertical load applied on the drive shaft.

It is yet another object of the present invention to provide a plurality of improved conveyor drive units, thereby obtaining a separate drive system for a roller-type drive system and attaining flexibility in the movement of articles.

The improved conveyor drive unit of the present invention is used for driving a planar array of a plurality of rollers preferably located to one side of the rollers whereby a flexible coupling connects each of the rollers with one of the pinion gears for driving the rollers. The improved conveyor drive unit comprises arrive gear, a plurality of pinion gears which are the drive elements disposed around the periphery of, and driven by, the drive gear. In one important embodiment of the invention, the sprocket means is frangible and is a zero-degree involute gear having a zero-degree pressure angle, thereby capable of operating on a tangential drive. In a further embodiment, the improved drive unit has heat sink means for dissipating heat produced from the sprocket means and the drive shaft during operation. Also, the drive control unit of the present invention has a minimal "hang-load" bearing against the drive shaft thereby further reducing the vertical load applied to the drive shaft.

DESCRIPTION OF THE PREFERRED EMBODIMENTS

Figure 1:
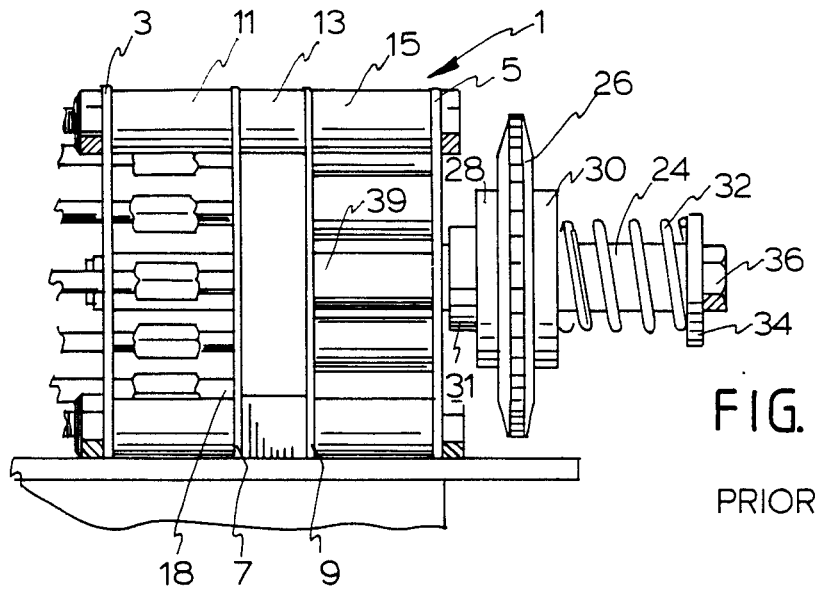
FIG. 1 is a side elevational view of a drive unit in accordance with the prior art.

Attention is first directed to FIG. 1 which shows a drive unit as shown in U.S. Pat. No. 4,313,536, generally referred to by reference number 1. The drive unit 1 has mounting plates 3, 5, 7 and 9 spaced apart by spacers 11, 13 and 15. A plurality of pinion shafts 18 are mounted on mounting plates 3, 5, 7 and 9. A drive shaft 24 is mounted on the mounting plates 3, 5, 7 and 9 and accommodates a sprocket wheel 26. Thrust washers 28 and 30 adjacent to the sprocket wheel 26 are further mounted on the drive shaft 24. A spacer or bearing 31 is seated on the drive shaft 24 adjacent the thrust washer 28. Thrust washer 30 is biased against sprocket wheel 26 by spring 32 which bears against washer 34 which, in turn, is secured to drive shaft 24 by means of bolt 36.

Figure 2:
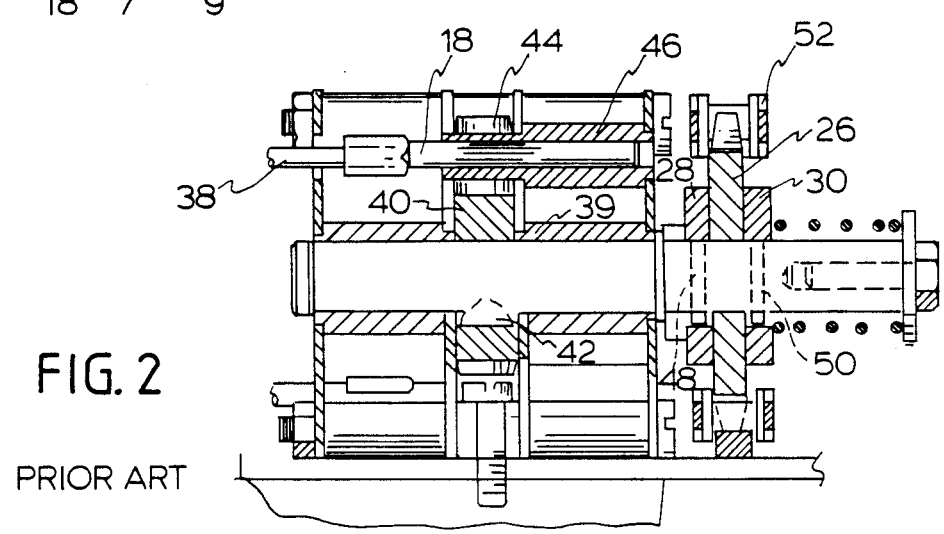
FIG. 2 is a cross-sectional view of the drive unit of FIG. 1, including an illustration of an associated chain for driving the sprocket wheel and an associated bolt for mounting the drive unit.

As more clearly shown in FIG. 2, one end of each pinion shaft 18 is bored and squared to receive a flexible shaft 38. Each flexible shaft 38 is connected to a conveyor roller (not shown). The drive shaft 24 rides in bushing 39 mounted between mounting plates 5 and 9. Drive gear 40 is affixed to drive shaft 24 by means of a key 42. Disposed in a circular array for meshing around drive gear 40 are a plurality of pinion gears 44 which are fixed to pinion shafts 18. Mounted between mounting plates 5 and 9 are bushings 46 for accommodating the pinion shafts 18. A pair of holes are drilled through drive shaft 24 on either side of the sprocket wheel 26 and pins 48 and 50 are inserted therethrough over which thrust washers 28 and 30 are inserted. Thus, thrust washers 28 and 30 are mounted on drive shaft 24 in a manner wherein they are fixed relative to the rotation of the drive shaft 24, but at least one of the thrust washers 28 and 30 is axially movable on the drive shaft 24.

The sprocket wheel 26 causes the thrust washers 28 and 30 to begin turning when a given force is applied by pressing the thrust washers 28 and 30 against the sprocket wheel 26. Once motion has begun, the thrust washers are forced against the sprocket wheel 26 and remain turning.

The pinion shafts in the unit of U.S. Pat. No. 4,313,536 are mounted on the thin mounting plates 3, 5, 7 and 9 while the drive shaft is enclosed within bushing 39. Thus, the rotating drive shaft 24 and the sprocket wheel 26 generate heat which cannot be dissipated by the thin mounting plates 3, 5, 7 and 9 thereby retaining the heat therein which can lead to the annealing or weakening of the aforesaid elements. Further, the construction of the drive unit 1 imposes multiple "hang loads" on the drive shaft 24, including the bearing or spacer 31, washers 28, 30 and 34, spring 32 and end bolt 36. The various elements which make up the hang loads when combined contribute to the vertical load exerted on the drive shaft 24 which results in unnecessary bending stress thereon.

Further, the sprocket wheel 26 is not tangentially driven thereby requiring higher pressure from the chain 52 in order to drive the same. Thus, undesirable stresses, including torsion stress, exerted on the drive shaft 24 exist. Also, the drive unit 1 includes a non-frangible sprocket wheel 26 which can lead to sets of rollers operated by a single chain 52 to jam when debris or an article is caught between a set of rollers operated by the drive unit 1.

Figure 3:
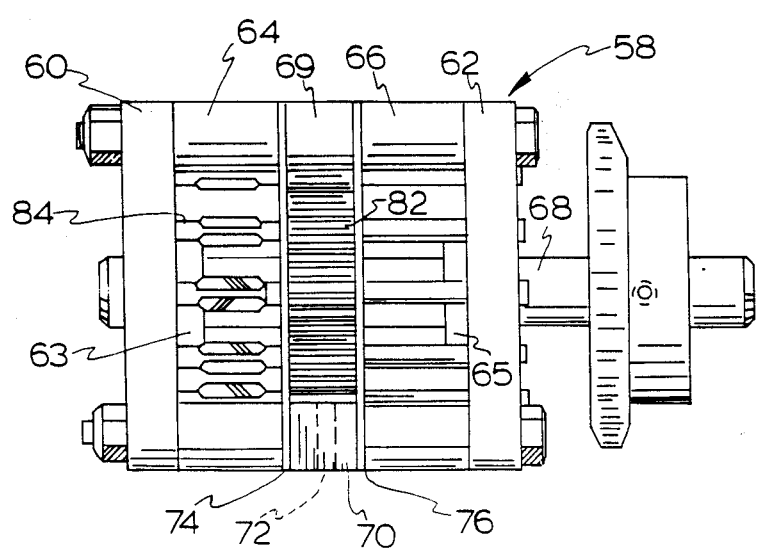
FIG. 3 is a side elevational view of an improved conveyor drive unit in accordance with the present invention showing the mounting plates and sprocket means mounted on a drive shaft.

FIG. 3 shows the improved conveyor drive unit of the present invention, generally designated by reference number 58. The conveyor drive unit 58 comprises heat sink plates 60 and 62 and spacers 64 and 66 therebetween. The ratio between the thickness of each of the heat sink plates 60 and 62 and the diameter of the drive shaft 68 can be 1:1 or 1:2. The drive shaft 68 is journalled in heat sink plates 60 and 62 which have bosses 63 and 65 which provide further support for the drive shaft 68, thereby not necessitating the enclosure of the drive shaft 68 in the bushings 39 as in the aforementioned prior drive unit.

The heat sink 60 and 62 are preferably made of "OI-LITE" bronze which is manufactured, for example, in the Amplex Division of the Chrysler Corporation, Van Wert, Ohio. Spacers 69 and 70 are mounted between heat sink plates 74 and 76. Spacer 70 is preferably made of stainless steel and has a threaded aperture 72 passing therethrough for accommodating bolts (not shown) when the control unit 58 is mounted. A drive gear 80 is fixed to drive shaft 68. A plurality of pinion gears 82 which are fixed to pinion shafts 84 are disposed in a circular array for meshing around a drive gear 80 (see FIG. 4).

Figure 4:
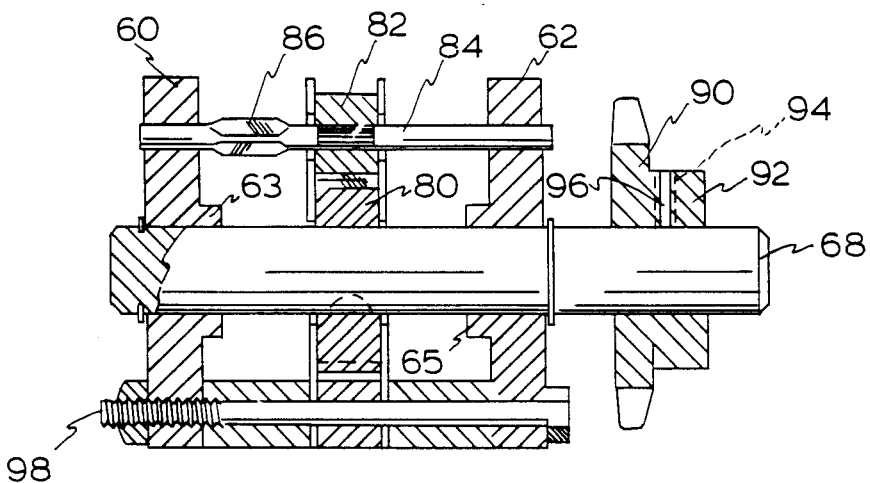
FIG. 4 is a partial cross-sectional view in accordance with the present invention showing at least one associated crimped shaft mounted on the mounting plates, and a sprocket means pinned on the drive shaft.

As better illustrated in FIG. 4, the pinion shafts 84 of the drive unit 58 of the instant invention have crimped portions 86 for inserting and connecting therein flexible shafts connected to the conveyor rollers (not shown). Further, the pinion shafts 84 substantially extend between, and are journalled in, heat sink plates 60 and 62 so that the end of the pinion shafts 84 which have a higher strength than the flexible shaft connected thereto can better withstand the shear and fatigue stresses during rotation than the arrangement taught in the above-discussed U.S. patent wherein a portion of the flexible shafts 38 is rotated within the apertures passing through the mounting plate 3. Further, the crimping of the flexible shafts to the pinion shafts 84 within the confines of the heat sink plates 60 and 62 similarly provides for a stronger coupling.

Further shown in FIG. 4 is a sprocket wheel 90 having an integral end piece 92 with an aperture 94 passing therethrough for accommodating a pin 96 for mounting the sprocket wheel 90 onto the drive shaft 68. Spacers 64, 66, 69 and 70 have a bolt 98 with a threaded end passing therethrough for mounting thereof between the mounting plates 60 and 62.

Figures 6, 7:
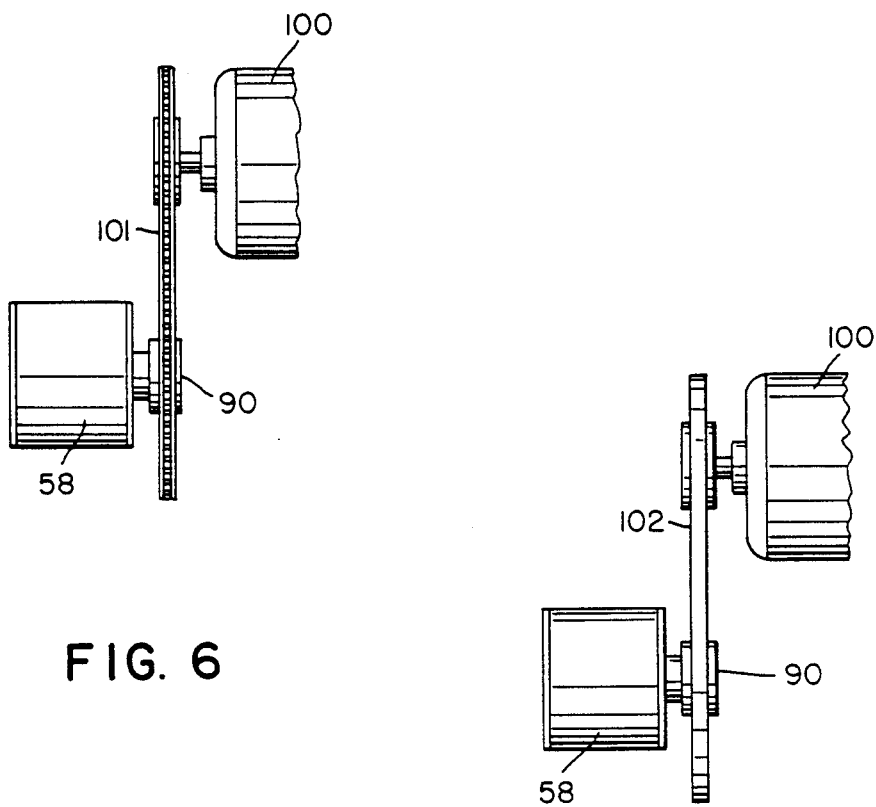
FIG. 6 is a schematic plan view illustrating a motor and chain drive.
FIG. 7 is a schematic plan view illustrating a motor and cog belt drive.

Referring to FIG. 6, it will be seen that the drive unit 58 is driven in a conventional manner by motor 100 through chain 101. An alternate embodiment is shown in FIG. 7 where drive unit 58 is driven in a conventional manner by motor 100 through a cog belt 102.

As shown in FIG. 4, the drive shaft 68 only has the sprocket wheel 90 mounted thereon, unlike the drive unit shown in U.S. Pat. No. 4,313,536. Thus, significant reduction in the vertical load on the drive shaft 68 is accomplished.

Figure 5:
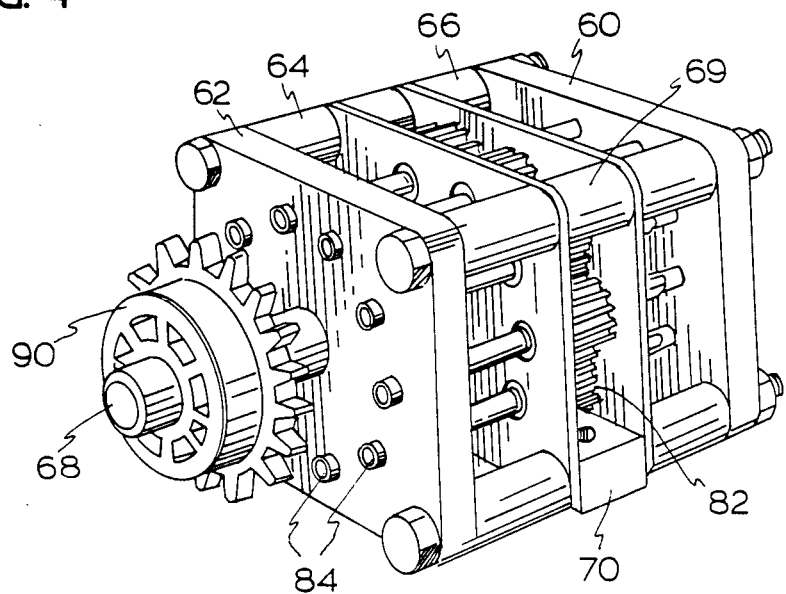
FIG. 5 is a perspective view of the improved conveyor drive unit in accordance with the present invention.

The sprocket wheel 90, as in FIG. 5, is a zero-degree involute gear, i.e., one which has a zero-degree pressure angle capable of operating on a tangential drive. Thus, practically no bending stress or torsion stress is applied on the drive shaft 68 when the chain drives the sprocket wheel 90. Thus, the torque applied by the chain on the sprocket wheel 90 having a zero-degree pressure angle, as opposed to a 14½- degree pressure angle, is reduced by 10 to 15 percent, thereby providing a significantly smooth and much improved driving of the sprocket wheel 90.

The sprocket wheel 90 is made of "NYLATRON" plastic which is generally a nylon material impregnated with lubricant, such as molybdenum disulfide. Further, the sprocket wheel is frangible, i.e., the teeth can be sheared, thereby stopping the set of conveyor rollers being driven by the affected control unit 58. Thus, jamming of an entire set of conveyor rollers being driven by a single chain can be prevented by the shearing of the sprocket wheel teeth of a single control unit.

While the invention has been particularly shown and described by reference to preferred embodiments thereof, it will be understood by those skilled in the art that changes in form and details may be made therein without departing from the spirit and scope of the invention

We claim:

1. A drive unit for an article transfer system having a plurality of sets of parallel rollers disposed in a planar array and forming a conveyor, comprising:
   (A) a pair of spaced apart heat sink plates;
   (B) a drive shaft journalled for rotation in said heat sink plates and extending at one end thereof through one of said plates;
   (C) a sprocket wheel which operates on a tangetial drive fixed to said one end of said drive shaft; and a drive gear fixed to said drive shaft intermediate said plates; and
   (D) a plurality of pinion gears disposed in a circular array around said drive gear to be driven thereby, said pinion gears being mounted on pinion shafts, said pinion shafts being fully extended and journalled for rotation in said pair of spaced apart heat sink plates, and said rollers being connected to said pinion shafts by connectors which are inserted and engaged into said pinions shafts.

2. A drive unit as defined in claim 1, wherein said heat sink plates have internally protruding bosses for providing additional support to said drive shaft.

3. A drive shaft as defined in claim 1, wherein said heat sink plates are made of a low friction bronze.

4. A drive unit as defined in claim 1, wherein said sprocket wheel has frangible sprocket teeth suitable for being sheared at a predetermined force applied on said frangible sprocket teeth.

5. A drive unit as defined in claim 4, wherein said sprocket wheel is a zero-degree of involute type sprocket.

6. A drive unit as defined in claim 5, wherein said sprocket is made of a lubricant impregnated nylon composition.

7. A drive unit for an article transfer system having a plurality of parallel rollers disposed in a planar array and forming a conveyor, comprising:
   (A) a drive shaft supported for rotation and having a drive gear fixed thereto;
   (B) a plurality of pinion gears disposed in a circular array around said drive gear to be driven thereby, said rollers being operatively connected into pinion shafts by means of connectors which are inserted and engaged into said pinion shafts which are in turn connected to said pinion gears, said pinion shafts being fully extended and journalled for rotation in a pair of spaced apart heat sink plates; and
   (C) a frangible driving sprocket means fixed to said drive shaft, said frangible drive sprocket means operating on a tangential drive.

8. A drive unit as defined in claim 7, wherein said frangible driving socket means is a zero-degree of involute type sprocket.

9. A drive unit as defined in claim 7, wherein said frangible driving sprocket means is made of a lubricant-impregnated nylon composition.

10. An article transfer mechanism which comprises a plurality of parallel rotatable rollers disposed in a planar array, forming a conveyor, and drive means, said drive means comprising:
    (A) input drive means having driving transmitting surfaces connected to a drive shaft;
    (B) a plurality of drive takeoff members disposed in a circular array around the periphery of, and driven by said input drive means;
    (C) a flexible coupling means for connecting each of said rollers and for inserting into and connecting with one of said takeoff members, whereby rotation of said takeoff members causes rotation of said rollers;
    (D) means for driving said input drive means, said driving means comprises a tangetial drive frangible type sprocket assembly directly coupled to said drive shaft; and
    (E) a pair of spaced apart heat sink plates supporting a drive shaft and said plurality of drive takeoff members for relieving heat from said sprocket assembly and said drive shaft takeoff members fully extend and are journalled for rotation in said pair of spaced apart heat sink plates.

11. Drive means as defined in claim 10, wherein said input drive means is a drive gear and said plurality of drive takeoff members is a plurality of pinion gears.

12. Drive means as defined in claim 11, wherein said heat sink plates has integrally protruding bosses for providing additional support to said drive shaft.

13. Drive means as defined in claim 12, wherein said heat sink plates is made of a low friction bronze.

14. Drive means as defined in claim 13, wherein said frangible sprocket assembly is made of a lubricant-impregnated nylon composition.

15. Drive means as defined in claim 14, wherein said means for driving said input drive means comprises a motor and is connected to said frangible sprocket assembly by a chain.

16. Drive means as defined in claim 14, wherein said means for driving said input drive means comprises a motor and is connected to said frangible sprocket assembly by a cog belt.

17. Drive means as defined in claim 16, wherein said pinion gears are fabricated of nylon.

18. Drive means as in claim 17, wherein said pinion gears are fixedly mounted in pinion shafts, said flexible coupling means are each crimped to a respective pinion shaft, and said pinion shaft is completely supported within said heat sink plates.

* * * * *